Patented Aug. 8, 1950

2,518,078

UNITED STATES PATENT OFFICE 2,518,078

MONOAZODYESTUFFS OF THE PYRAZOLONE SERIES FREE FROM SULFONIC ACID GROUPS AND A PROCESS OF MAKING SAME

Otto Schmid, Muttenz, and Max Buchs, Basel, Switzerland, assignors to J. R. Geigy A. G., Basel, Switzerland, a Swiss firm No Drawing. Application January 27, 1947, Serial No. 724,710. In Switzerland January 31, 1946

12 Claims. (Cl. 260—162)

Among the azo dyestuffs for wool, disazo dyestuffs which are fast to washing, fulling, perspiration and to sea-water have become important in the trade. Such disazo dyestuffs which often contain an aryl sulfonic acid phenol ester grouping possess, however, important disadvantages, when used for the wool dyeing.

It is a known fact that for instance the levelling power of such dyestuffs on wool is mostly a bad one. In practice it has been observed that it is preferable to give up to some extent the excellent fastness properties to washing, fulling, perspiration and to sea-water in favor of an improved levelling power with the condition that the said fastness properties are still always good. Thus, dyestuffs of good fastness properties to washing, fulling, perspiration and to sea-water which are superior to the said disazo dyestuffs with respect to the levelling power, but which do not attain the excellent fastness properties in the moist state of the said disazo dyestuffs, have become more important. A further disadvantage of the said disazo dyestuffs consists in light-fastness properties which do not suffice for modern requirements.

Now, the present process enables the production of yellow pyrazolone dyestuffs possessing better fastness properties in the moist state than the usual sulfonated pyrazolone azo dyestuffs and improved levelling power when compared with the above mentioned disazo dyestuffs. More particularly it is possible according to the present process to produce better light-fast dyestuffs possessing good fastness properties in the moist state and furthermore a good levelling power.

We have found that monoazo dyestuffs containing no sulfonic acid groups, but containing halogen atoms and obtainable from the interaction of diazotised aminophenyl-(aryl)- or -(aralkyl)-disulfimides and 5-pyrazolones can be dyed onto wool from an aqueous solution according to a special dyeing method used for wool dyestuffs, thus giving well levelled dyeings which, when compared with simple sulfonated monoazo dyestuffs of the pyrazolone series, are distinguished by improved fastness properties to washing, fulling and to sea-water and which possess very good light-fastness properties, the latter properties depending upon the constitution of the dyestuffs. The new dyestuffs correspond to the following general formula

I $$X-SO_2-NH-SO_2-Y-N=N-CH-CO$$
$$\phantom{X-SO_2-NH-SO_2-Y-N=N-}\big|\phantom{CO}\ \ \ N-\text{Cl-phenyl}$$
$$\phantom{X-SO_2-NH-SO_2-Y-}CH_3-C=N$$

wherein X means a member of the group consisting of phenyl, especially chlorophenyl, naphthyl and benzyl radicals, and Y means a phenylene radical, all these radicals being free from any sulfonic acid groups.

Beside chlorine the new dyestuffs of the present invention may contain still further substituents usual in dyestuffs, such for example as alkyl groups, alkoxy, aryloxy, nitro, acylamino groups and the like. Even halogen-free dyestuffs falling within the above Formula I possess better fastness properties to washing, fulling and to sea-water than the corresponding simple sulfonated pyrazolone dyestuffs. According to the present invention the said properties can still further be improved, when using for the production of the dyestuffs components containing halogen atoms. Among "halogen-containing components" may be understood, as stated above, the easily available chlorine- and bromine-containing components. In general components containing chlorine will be preferred due to the low costs. The halogen can be present not only in the coupling component but also in one of the radicals X and Y and either once or preferably several times in form of substituents. According to the place of linkage dyestuffs will be obtained which are distinguished by better fastness properties in the moist state and more particularly by a better sea-water fastness of the wool dyeing, while on the other hand dyestuffs of a very good light-fastness or dyestuffs possessing both these properties in an improved degree can be obtained, as will be further illustrated in the present specification.

Suitable diazo components enhancing the light-fastness of the pyrazolone monoazo dyestuffs produced therefrom are those corresponding to the following general formulae

II $$X-SO_2-NH-SO_2-\text{(phenyl)}-Cl$$
$$\phantom{X-SO_2-NH-SO_2-\text{(phenyl)}-}NH_2$$

III $$X-SO_2-NH-SO_2-\text{(naphthyl)}$$
$$\phantom{X-SO_2-NH-SO_2-}NH_2$$

Diazo components, in which X represents a mono-, di- or trihalogen phenyl radical, a naphthyl radical or a tetrahydronaphthyl radical, have a favorable influence on the fastness properties in the moist state of wool dyeings produced by pyrazolone monoazo dyestuffs.

The diazo components used according to this invention are partly known and partly novel. Their preparation can be effected according to known methods by condensation of aromatic or araliphatic sulfonic acid halides suitably substituted with aromatic sulfonic acid amides or alkali salts thereof either by melting the components together or in the presence of an inert solvent, like chlorobenzene, or in the presence of water. The components are selected in such a manner that the resultant disulfimide will contain a diazotisable amino group or a substituent convertible into such an amino group, such as a nitro or an acylamino group which, after having carried out the condensation, will be reduced or saponified respectively.

The new dyestuffs are water-soluble, yellow to orange powders possessing generally a good affinity to animal fibres and dyeing wool in even, greenish-yellow to yellow shades which partly possess remarkably good fastness properties to sea-water.

The following examples illustrate the invention without however limiting the same. Parts by weight bear the same relation to parts by volume as do grams to cubic centimeters.

*Example 1*

36.6 parts of 2-aminophenyl-(1':2':3':4'-tetrahydronaphthyl-5'- and -6')-disulfimide are dissolved in form of the sodium salt with 6.9 parts of sodium nitrite in 500 parts of water. This solution having a temperature of about 25° C. is caused to drop at 5-8° C. into 30 parts of 30 per cent hydrochloric acid and the required quantity of ice. The colorless diazo suspension is allowed to flow at 10° C. into a solution of 21 parts of 1-(3'-chlorophenyl)-3-methyl-5-pyrazolone in 400 parts of water, to which have been added 13.5 parts of 30 per cent caustic soda lye and 25 parts of sodium carbonate, the solution being stirred during the addition of the diazo suspension. The mixture is first stirred for 3 hours at 12-15° C., and subsequently for several more hours at 30-40° C., whereupon the dyestuff precipitated is filtered by suction at room temperature. It corresponds to the formula

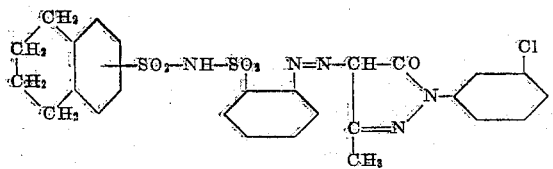

The new dyestuff, when dried, is an orange-yellow powder dissolving in hot water and in concentrated sulfuric acid with a bright yellow coloration. When applied onto wool from a neutral to slightly acid bath, the dyestuff shows a very good affinity and produces even, yellow dyeings of good fastness properties to washing, fulling and to sea-water and of very good light-fastness.

The diazo component used in this example can be obtained as follows: 40.4 parts of o-nitrobenzene sulfamide are dissolved with 27 parts of 30 per cent sodium hydroxide in 400 parts of water at a temperature of 70° C., 50 parts of a mixture of 1:2:3:4-tetrahydronaphthalene-5- and -6-sulfonic acid chloride, obtained from the technical mixture of the sulfonic acids and liquefied by heating, as well as 31-34 parts of 30 per cent caustic soda lye being simultaneously added dropwise to this solution in such a manner that the same always shows a phenolphthaleine-alkaline reaction. The reaction product separating out in a crystalline form on cooling is dissolved in water and reduced with iron in an acetic solution or by means of sodium sulfide according to known methods. The amino compound is a white powder dissolving in hot water on addition of sodium carbonate with development of carbon dioxide.

According to similar methods further diaryl disulfimides can be obtained, some of which are enumerated in the following.

A dyestuff of similar properties can be obtained, when using in the above example, instead of 2-aminophenyl-(1':2':3':4'-tetrahydronaphthyl-5'- and -6')-disulfimide, 36.8 parts of 2-aminophenyl-(1'-methyl-4'-isopropyl-phenyl-2'- and -3')-disulfimide (obtained from a technical cymol monosulfonic acid mixture). It corresponds to the formula

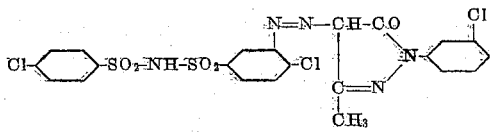

*Example 2*

36.2 parts of 2-aminophenyl-(naphthyl-2')-disulfimide (in form of the sodium salt) and 6.9 parts of sodium nitrite are dissolved in 500 parts of water and the solution warmed up to 30° C. is caused to drop, while stirring, into 30 parts of 30 per cent hydrochloric acid and into the required quantity of ice, the latter mixture being kept at 5-8° C. After one hour the yellowish diazo suspension is made neutral to Congo paper by addition of sodium bicarbonate and then mixed with the solution of 21 parts of 1-(3'-chlorophenyl)-3-methyl-5-pyrazolone in 400 parts of water admixed with 10 parts of 24 per cent ammonia water. The mixture is stirred for several hours at 10-12° C. and still further seven parts of 24 per cent ammonia water are slowly dropped thereinto. Then the temperature of the mixture is allowed to rise to room temperature and after some hours it is increased to 40° C. After still several hours the dyestuff precipitated in form of a yellow-orange powder is filtered off at room temperature. It constitutes, when dried, a yellow-orange powder dissolving in hot water and in concentrated sulfuric acid with a bright yellow coloration. The new dyestuff dyes wool from a slightly acid bath in even yellow shades of good fastness properties to washing, fulling and to perspiration and of a very good light-fastness.

Dyestuffs having similar properties are obtained by using in the above example, instead of 2-aminophenyl-(naphthyl-2')-disulfimide, 36.2 parts of 2-aminophenyl-(naphthyl-1')-disulfimide.

The diazo components are obtained in the manner described in Example 1 from o-nitrobenzene sulfamide and naphthalene-2- or -1-sulfonic acid chloride in form of white powders easily soluble in hot water with sodium carbonate under development of carbon dioxide.

*Example 3*

32.6 parts of 4-aminophenyl-(benzyl)-disulfimide (in form of the sodium salt thereof) and 6.9 parts of sodium nitrite are dissolved in 500 parts of water and the resulting solution, after cooling to 20° C., is allowed to drop while stirring at 5-8° C. into 30 parts of 30 per cent hydrochloric acid and into the required quantity of ice. After stirring for one hour the pure white diazo crystallisation is filtered by suction and again stirred with 100 parts of ice. The suspension is then added at 10° C. to a solution of 21 parts of 1-(3'-chlorophenyl)-3-methyl-5-pyrazolone in 400 parts of water, to which have been added 10 parts of 24 per cent ammonia water. Then the mixture is stirred for 3 hours at 10–12° C. and simultaneously still further 7 parts of 24 per cent ammonia water are added. The temperature is then slowly raised to 30° C. and maintained for some hours. The dyestuff is precipitated by addition of sodium chloride, filtered by suction and dried. It forms a yellow powder dissolving in hot water with a yellow coloration and in concentrated sulfuric acid with a greenish-yellow coloration. The dyestuff dyes wool from a slightly acid bath in yellow, even shades of good sea-water fastness properties.

4-aminophenyl-(benzyl)-disulfimide can be prepared according to the method indicated in Example 1 by interaction of 4-nitrobenzene sulfamide with benzyl sulfochloride and reduction of the nitro group with iron in an aqueous acetic acid solution.

Dyestuffs of similar properties will be obtained when using the same quantity of 3-aminophenyl-(benzyl)-disulfimide as diazo component. Similar dyestuffs can also be obtained with 36 parts of 3-aminophenyl-(4'-chlorobenzyl)-disulfimide and with 40.5 parts of 3-aminophenyl-(4'-bromobenzyl)-disulfimide as diazo components.

*Example 4*

38.1 parts of 3-amino-4-chlorophenyl-(4'-chlorophenyl)-disulfimide (as sodium salt) and 6.9 parts of sodium nitrite are dissolved in 1000 parts of water and the resulting solution having a temperature of 35° C. is allowed to drop while stirring at 5–10° C. into 30 parts of 30 per cent hydrochloric acid and the necessary quantity of ice. A white crystal paste of the diazo compound, which is completely insoluble in water, thus results; after one hour it is filtered by suction, sludged with small quantities of ice water and mixed with the solution of 21 parts of 1-(3'-chlorophenyl)-3-methyl-5-pyrazolone in 400 parts of water previously treated with 15 parts of 24 per cent ammonia water. The mixture is first stirred for 3 hours at 10° C., then for several more hours at 30° C. and heated for a short period to 50° C., whereupon the so-formed dyestuff is filtered by suction at room temperature. The new dyestuff, when dried, is a reddish-yellow powder dissolving in water with a yellow coloration and in concentrated sulfuric acid with a greenish-yellow coloration. The dyestuff dyes wool from a slightly acid bath in even yellow shades distinguished by good fastness properties to washing, fulling and to sea-water as well as by excellent light-fastness properties.

Dyestuffs of similar properties can be obtained, when using in the above example, instead of 3-amino-4-chlorophenyl-(4'-chlorophenyl)-disulfimide, 42.6 parts of 3-amino-4-chlorophenyl-(4'-bromophenyl)-disulfimide or 37.7 parts of 3-amino-4-chlorophenyl-(4'-methoxyphenyl)-disulfimide or 40.4 parts of 3-amino-4-chlorophenyl-(4'-acetylaminophenyl)-disulfimide as diazo components. The said diazo components can be prepared according to the method described in Example 1.

*Example 5*

50.8 parts of 3-amino-4-(4''-chlorophenoxy)-phenyl-(3':4'-dichlorophenyl)-disulfimide (in form of its sodium salt) and 6.9 parts of sodium nitrite are dissolved in 600 parts of water and this solution having a temperature of 40° C. is caused to drop, while stirring, at 10° C. into 30 parts of 30 per cent hydrochloric acid and into the required quantity of ice. The yellowish diazo suspension is stirred for one hour and then mixed with a solution of 21 parts of 1-(3'-chlorophenyl)-3-methyl-5-pyrazolone in 400 parts of water previously treated with 13.5 parts of 30 per cent caustic soda lye and 25 parts of sodium carbonate. The mixture is first stirred at 10° C. for 3 hours, then at room temperature for 10 hours and finally at 35–40° C. for still further 3 hours. The so-formed dyestuff is filtered by suction at room temperature and dried. It constitutes an orange-yellow powder dissolving in hot water as well as in concentrated sulfuric acid with a yellow coloration. The new dyestuff dyes wool from a slightly acid dye-bath in yellow shades of good fastness properties to washing, fulling and to sea-water.

The diazo component used in this example will be prepared as follows: By condensation of 3:4-dichlorobenzene sulfonic acid chloride with 3-nitro-4-chlorobenzene-sulfonic acid amide according to the method disclosed in Example 1 there will be obtained 3-nitro-4-chlorophenyl-(3':4'-dichlorophenyl)-disulfimide which is dissolved in the threefold theoretical quantity of p-chlorophenol, to which 10 per cent by weight of water have been added. The whole is boiled under reflux, while dropping thereinto within 1 hour the theoretical quantity of 30 per cent caustic soda lye. Then the mixture is stirred under reflux for still 10 hours, whereupon the chlorophenol present in excess is removed by steam distillation and the yellow solution is reduced with iron and acetic acid. In this way 3-amino-4-(4''-chlorophenoxy)-phenyl-(3':4'-dichlorophenyl)-disulfimide is obtained in form of a white powder dissolving in hot water after addition of sodium carbonate with development of carbon dioxide.

Dyestuffs of similar properties are obtained, when substituting the 3-amino-4-(4''-chlorophenoxy)-phenyl-(3':4'-dichlorophenyl)-disulfimide in the above example by 47.3 parts of 3-amino-4-phenoxyphenyl-(3':4'-dichlorophenyl)-disulfimide or by 45.3 parts of 3-amino-4-(2''-methylphenoxy)-phenyl-(4'-chlorophenyl)-disulfimide and when using, instead of 1-(3'-chlorophenyl)-3-methyl-5-pyrazolone, 17.4 parts of 1-phenyl-3-methyl-5-pyrazolone and otherwise working in an analogous manner. The latter diazo components can also be made according to the above described method.

The production of further diazo components can be carried out in an analogous manner to the method disclosed in details in Example 1. With respect thereto it may be noted that for the manufacture of a diaryl disulfimide of the general formula A—SO₂—NH—SO₂—B two different ways are possible which can be represented by the following 2 formulae

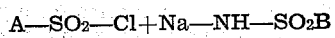

A—SO₂—Cl+Na—NH—SO₂B and A—SO₂—NH—Na+Cl—SO₂—B. It can be observed that often both these ways will not give the same yields so that it may be advantageous to determine by a previous experiment the more favorable method for the intended purpose.

Some further dyestuffs illustrating the objects of the present invention will be shown in the following table. All these dyestuffs can be made according to the methods disclosed in the above examples, while using the diazo components and the coupling components shown in said table.

Table

| No. | diazo component | coupling component | shade of wool dyeing |
|---|---|---|---|
| 1 | 4-aminophenyl-(4'-chlorophenyl)-disulfimide | 1-(3'-chlorophenyl)-3-methyl-5-pyrazolone | yellow. |
| 2 | 3-amino-6-methyl-phenyl-(naphthyl-1')-disulfimide | do | Do. |
| 3 | 3-amino-6-methylphenyl-(2':4'-dichlorophenyl)-disulfimide | do | Do. |
| 4 | 3-aminophenyl-(2':5'-dichlorophenyl)-disulfimide | do | Do. |
| 5 | 3-amino-4-chlorophenyl-(phenyl)-disulfimide | do | Do. |
| 6 | 3-amino-4-chlorophenyl-(naphthyl-1')-disulfimide | do | Do. |
| 7 | 3-amino-4-chlorophenyl-(2':5'-dichlorophenyl)-disulfimide | do | Do. |
| 8 | 3-aminophenyl-(3':4'-dichlorophenyl)-disulfimide | do | Do. |
| 9 | 3-aminophenyl-(2':4':5'-trichlorophenyl)-disulfimide | do | Do. |
| 10 | 3-amino-4-chlorophenyl-(naphthyl-2')-disulfimide | do | Do. |
| 11 | 3-aminophenyl-(tetrahydronaphthyl-5'- and -6')-disulfimide | do | Do. |
| 12 | 3-amino-4-chlorophenyl-(tetrahydronaphthyl-5'- and -6')-disulfimide | do | Do. |
| 13 | 3-amino-6-chlorophenyl-(4':5'-dichlorophenyl)-disulfimide | do | Do. |
| 14 | 3-amino-6-chlorophenyl-(2':4'-dichlorophenyl)-disulfimide | do | Do. |
| 15 | 2-aminophenyl-(3':4'-dichlorophenyl)-disulfimide | do | Do. |
| 16 | 2-aminophenyl-(2':4':5'-trichlorophenyl)-disulfimide | do | Do. |
| 17 | 2-amino-4-chlorophenyl-(4'-chlorophenyl)-disulfimide | do | Do. |
| 18 | 3-amino-4-chlorophenyl-(3':4'-dichlorophenyl)-disulfimide | do | Do. |

Formulae of representative dyestuffs of the preceding table are as follows:

(1)
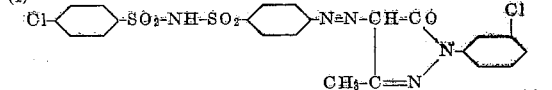

(7)
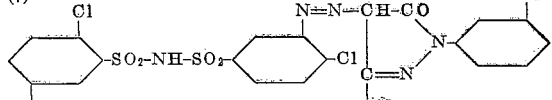

(10)
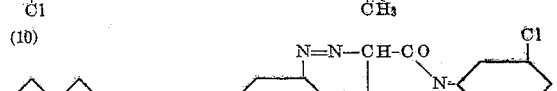

What we claim is:
1. Process for the manufacture of a yellow monoazo dyestuff of the pyrazolone series, free from sulfonic acid groups, hydroxy groups and carboxylic acid groups, and corresponding to the general formula

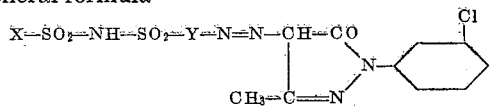

wherein X stands for a member selected from the group consisting of chlorophenyl, naphthyl and benzyl radicals and Y stands for a phenylene radical, which comprises coupling a diazotised amine of the general formula

X—SO₂—NH—SO₂—Y—NH₂ with a 5-pyrazolone of the formula

wherein X and Y have the above defined meanings.

2. Process for the manufacture of a yellow monoazo dyestuff of the pyrazolone series, free from sulfonic acid groups, hydroxy groups and carboxylic acid groups, and corresponding to the general formula

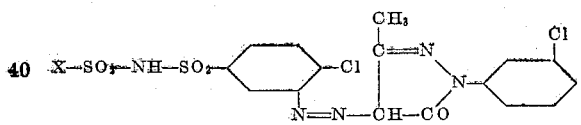

wherein X stands for a member selected from the group consisting of chlorophenyl, naphthyl and benzyl radicals, which comprises coupling a diazotised amine of the general formula

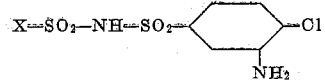

with a 5-pyrazolone of the formula

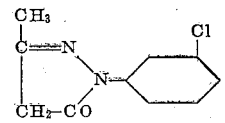

wherein X has the above defined meaning.

3. Process for the manufacture of a yellow monoazo dyestuff of the pyrazolone series, free from sulfonic acid groups, hydroxy groups and carboxylic acid groups, and corresponding to the general formula

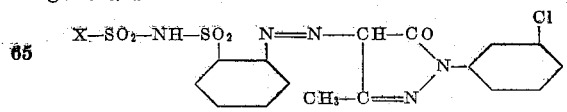

wherein X stands for a member selected from the group consisting of chlorophenyl, naphthyl and benzyl radicals, which comprises coupling a diazotised amine of the general formula

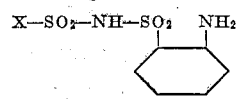

with a 5-pyrazolone of the formula

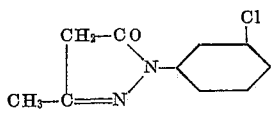

wherein X has the above defined meaning.

4. Process for the manufacture of a yellow monoazo dyestuff free from sulfonic acid groups of the formula

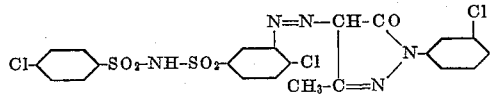

which comprises coupling diazotised 3-amino-4-chlorophenyl-(4'-chlorophenyl) disulfimide with 1-(3'-chlorophenyl)-3-methyl-5-pyrazolone.

5. Process for the manufacture of a yellow monoazo dyestuff free from sulfonic acid groups of the formula

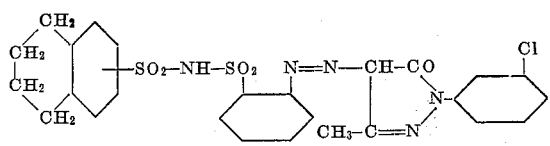

which comprises coupling diazotised 2-aminophenyl-(tetrahydronaphthyl)-disulfimide with 1-(3'-chlorophenyl)-3-methyl-5-pyrazolone.

6. The yellow monoazo dyestuffs of the pyrazolone series, free from sulfonic acid groups, hydroxy groups and carboxylic acid groups, of the general formula

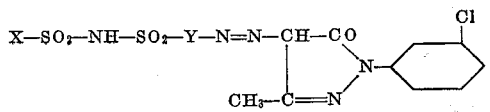

wherein X stands for a member selected from the group consisting of chlorophenyl, naphthyl and benzyl radicals and Y stands for a phenylene radical.

7. The yellow monoazo dyestuff of the pyrazolone series, free from sulfonic acid groups, hydroxy groups and carboxylic acid groups, of the general formula

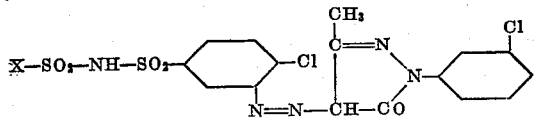

wherein X stands for a member selected from the group consisting of chlorophenyl, naphthyl and benzyl radicals.

8. The yellow monoazo dyestuff of the pyrazolone series, free from sulfonic acid groups, hydroxy groups and carboxylic acid groups, of the general formula

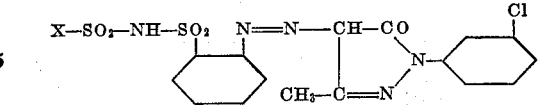

wherein X stands for a member selected from the group consisting of chlorophenyl, naphthyl and benzyl radicals.

9. The yellow monoazo dyestuff of the formula

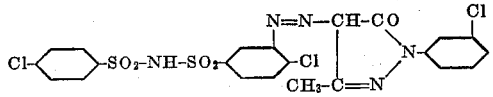

10. The yellow monoazo dyestuff of the formula

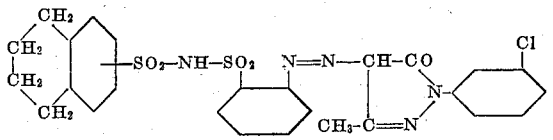

11. Process for the manufacture of a yellow monoazo dyestuff, free from sulfonic acid groups, of the formula

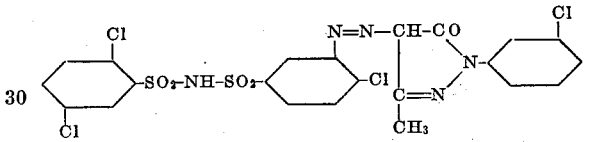

which comprises coupling diazotised 3-amino-4-chloro-phenyl-(2':5'-dichlorophenyl)-disulfimide with 1-(3'-chlorophenyl)-3-methyl-5-pyrazolone.

12. The yellow monoazo dyestuff of the formula

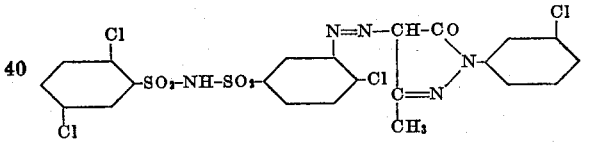

OTTO SCHMID.
MAX BUCHS.

REFERENCES CITED

The following references are of record in the file of this patent:

UNITED STATES PATENTS

| Number | Name | Date |
|---|---|---|
| 1,876,884 | Eichwede et al. | Sept. 13, 1932 |
| 2,199,043 | Conzetti | Apr. 30, 1940 |
| 2,295,050 | Reynolds | Sept. 8, 1942 |

FOREIGN PATENTS

| Number | Country | Date |
|---|---|---|
| 488,792 | France | July 22, 1918 |